(12) United States Patent
Oishi et al.

(10) Patent No.: US 7,519,097 B2
(45) Date of Patent: Apr. 14, 2009

(54) SPREAD-SIGNAL MULTIPLEXING CIRCUIT

(75) Inventors: Yasuyuki Oishi, Kawasaki (JP); Tokuro Kubo, Kawasaki (JP); Kazuo Nagatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1191 days.

(21) Appl. No.: 10/279,394

(22) Filed: Oct. 24, 2002

(65) Prior Publication Data
US 2003/0161339 A1    Aug. 28, 2003

(30) Foreign Application Priority Data
Feb. 27, 2002    (JP) .............................. 2002-051659

(51) Int. Cl.
*H04B 7/216* (2006.01)

(52) U.S. Cl. ...................... 375/130; 370/319; 370/320; 370/321; 370/330; 370/335; 370/342; 370/345; 370/347; 370/441; 342/150; 342/151; 342/152; 342/153; 342/154; 333/193; 333/194; 333/195; 333/196

(58) Field of Classification Search ................. 375/130; 370/319, 320, 321, 330, 335, 342, 345, 347, 370/441; 342/150, 151, 152, 154, 155; 333/193, 333/194, 195, 196
See application file for complete search history.

(56) References Cited

U.S. PATENT DOCUMENTS 6,144,694 A * 11/2000 Uta et al. .................... 375/146
6,728,298 B1 * 4/2004 Okubo et al. ............... 375/146

FOREIGN PATENT DOCUMENTS

| JP | 11-145932 | 5/1999 |
|---|---|---|
| JP | 11-154927 | 6/1999 |
| JP | 11-313042 | 9/1999 |
| JP | 11-274983 | 10/1999 |
| JP | 2000-106548 | 4/2000 |
| JP | 2001-086094 | 3/2001 |
| JP | 2001-217812 | 8/2001 |
| JP | 2001-285088 | 10/2001 |
| JP | 2002-044054 | 2/2002 |

* cited by examiner

*Primary Examiner*—Shuwang Liu
*Assistant Examiner*—Helene Tayong
(74) *Attorney, Agent, or Firm*—Katten Muchin Rosenman LLP

(57) ABSTRACT

The invention relates to a spread-signal multiplexing circuit for frequency-multiplexing a plurality of spread signals that were generated in parallel according to the SSMA scheme. An object of the invention is to adapt to various degrees of multiplicity and to keep the SN ratio and the power efficiency high. To this end, a spread-signal multiplexing circuit of the invention comprises an amplitude monitoring part for multiplexing a plurality of spread signals and determining amplitude of a resulting signal in time-series order; a delaying part for delaying the spread signals in parallel by a time that is equal to a propagation delay time of the amplitude monitoring part; and a multiplexing part for generating a multiplexed signal by multiplexing the delayed spread signals while weighting the delayed spread signals in parallel using weights that are smaller as an average value of the determined amplitude is larger.

12 Claims, 8 Drawing Sheets

F I G. 1
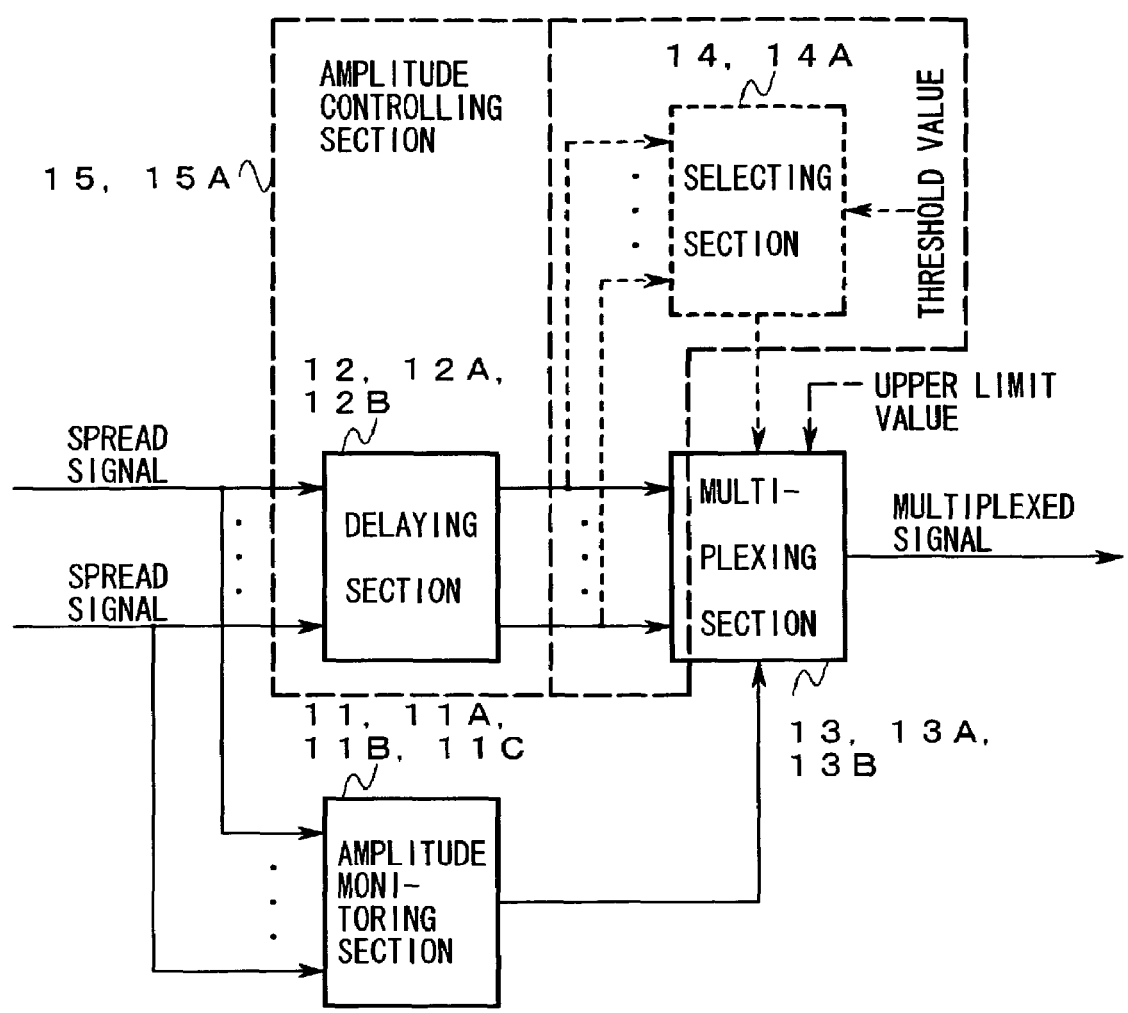

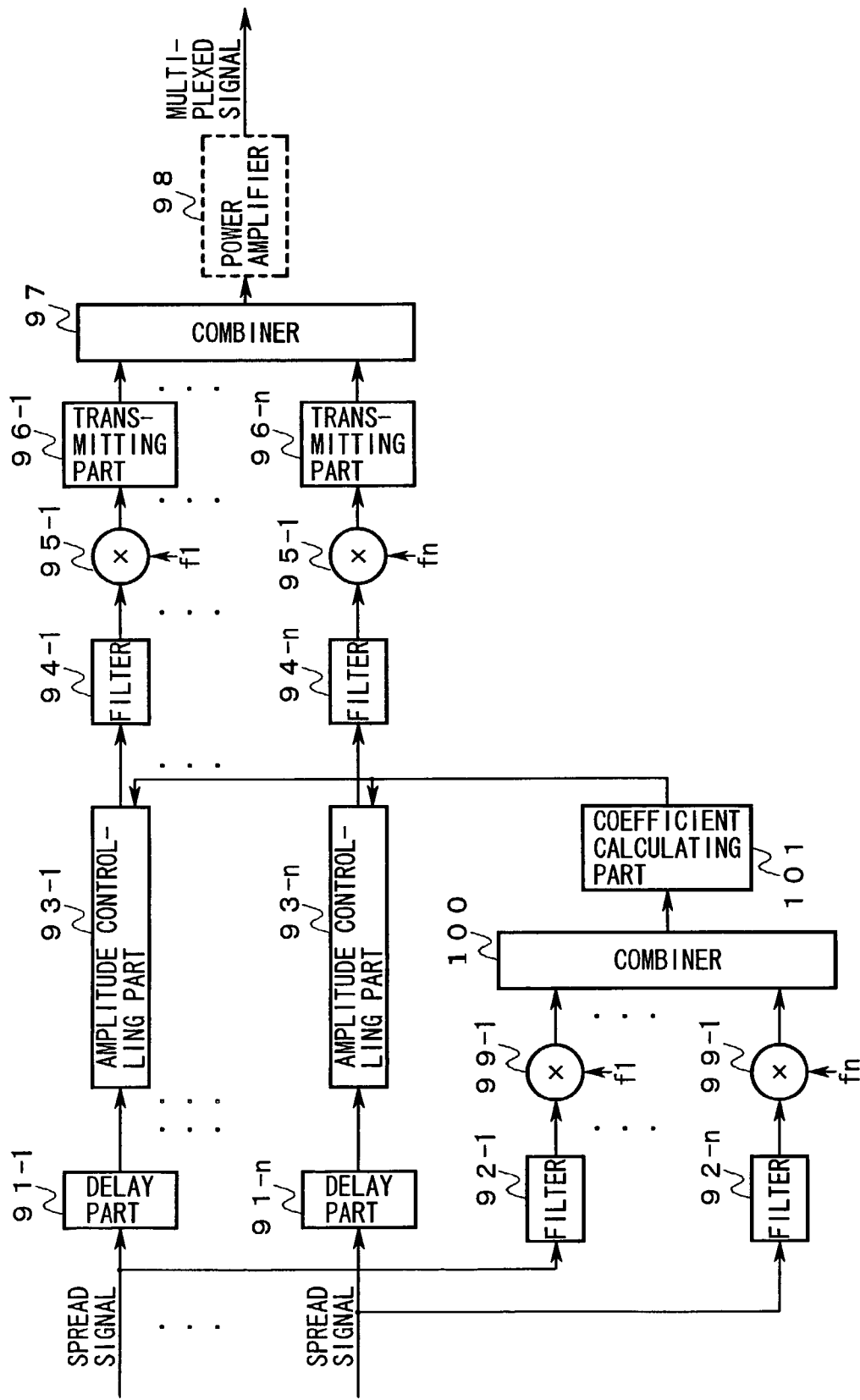

SPREAD-SIGNAL MULTIPLEXING CIRCUIT

BACKGROUND OF THE INVENTION

1. Field of the Invention

The present invention relates to a spread-signal multiplexing circuit for multiplexing a plurality of spread signals that were generated in parallel according to the SSMA (spread spectrum multiple access) scheme.

2. Description of the Related Art

The CDMA scheme is now positively applied to mobile communication systems increasingly because it is inherently superior in secrecy and resistance to interference, it enables flexible adaptation to multimedia and a variety of channel allocation forms, and a transmitting power control technique that can solve the near-far problem has been established recently.

In such mobile communication systems, the number of terminals where a call may occur and that exist in the wireless zone of a radio base station always varies depending on the time zone and other factors. In general, the above number increases from immediately after a start of operation of each radio base station or a corresponding mobile communication system.

In view of the above, the transmission system of each radio base station is equipped with spread-signal multiplexing circuits to enable both of flexible addition to accommodate increase in the number of terminals that may exist in the wireless zone of the radio base station and sharing of an antenna system to be used for transmission.

FIG. 8 shows the configuration of an exemplary conventional spread-signal multiplexing circuit.

As shown in FIG. 8, a plural number n of spread signals that were generated in parallel are supplied to the inputs of delay parts 91-1 to 91-n and filters 92-1 to 92-n, respectively. The outputs of the delay parts 91-1 to 91-n are connected to the inputs of filters 94-1 to 94-n via amplitude controlling parts 93-1 to 93-n, respectively. The outputs of the filters 94-1 to 94-n are connected to the inputs of transmitting parts 96-1 to 96-n via frequency converters 95-1 to 95-n, respectively. The outputs of the transmitting parts 96-1 to 96-n are connected to the corresponding inputs of a combiner 97. The output of the combiner 97 is connected to an antenna system (not shown) via a power amplifier 98. A plural number n of local frequency signals that correspond to bands where occupied bands of the n spread signals should be allocated on the frequency axis, respectively, and have different frequencies f1 to fn are supplied to the local frequency inputs of the frequency converters 95-1 to 95-n, respectively.

The outputs of the filters 92-1 to 92-n are connected to the inputs of frequency converters 99-1 to 99-n, respectively. The outputs of the frequency converters 99-1 to 99-n are connected to the corresponding inputs of a combiner 100. The output of the combiner 100 is connected to the coefficient inputs of the amplitude controlling parts 93-1 to 93-n via a coefficient calculating part 101. The above-mentioned n local frequency signals are supplied to the local frequency inputs of the frequency converters 99-1 to 99-n, respectively.

In the spread-signal multiplexing circuit having the above configuration, the filters 94-1 to 94-n have passages bands that are equal to the occupied bands of the n spread signals and the filters 92-1 to 92-n have passages bands that are somewhat wider than the passages bands of the filters 94-1 to 94-n.

The frequency converters 99-1 to 99-n generate a plural number n of intermediate frequency signals (hereinafter referred to as "subintermediate frequency signals") in parallel by shifting, on the frequency axis, the occupied bands of the n spread signals to different bands corresponding to the frequencies f1 to fn, respectively. The combiner 100 combines those subintermediate frequency signals into a subtransmission wave signal.

On the other hand, holding propagation delay times that are equal to those of the parts from the inputs of the filters 92-1 to 92-n to the output of the coefficient calculating part 101 via the frequency converters 99-1 to 99-n and the combiner 100, respectively, the delay parts 91-1 to 91-n delay the n spread signals by those propagation delay times, respectively, in parallel. In the following description, for the sake of simplicity, spread signals that are output from the delay parts 91-1 to 91-n in parallel are called delayed spread signals, respectively.

The amplitude controlling parts 93-1 to 93-n limit (weight) the amplitudes of the delayed spread signals as appropriate chip by chip in accordance with a coefficient that is calculated by the coefficient calculating part 101. In the following description, for the sake of simplicity, spread signals that are output from the amplitude controlling parts 93-1 to 93-n in parallel will be called "shaped spread signals," respectively.

The filters 94-1 to 94-n, the frequency converters 95-1 to 95-n, the transmitting parts 96-1 to 96-n, and the combiner 97 generate a transmission wave signal by frequency-multiplexing the n shaped spread signals. The generated transmission wave signal is supplied to the antenna system via the power amplifier 98. Pieces of processing that are performed by the individual parts during the above frequency multiplexing are basically the same as those that are performed by the filters 92-1 to 92-n, the frequency converters 99-1 to 99-n, and the combiner 100, and hence will not be described.

The coefficient calculating part 101 detects the peak value of the instantaneous value of the subtransmission wave signal chip by chip. For example, the coefficient calculating part 101 calculates, one by one, a coefficient z that is equal to the reciprocal of a ratio of the peak value to a known upper limit value that the peak value is allowed to have or the reciprocal of the square of the ratio.

The amplitude controlling parts 93-1 to 93-n generate n shaped spread signals by multiplying the instantaneous values of the n delayed spread signals by the common coefficient z, respectively.

With the above processing, even if the instantaneous values of the n spread signals become too large in any chip-based combination, the instantaneous value of the transmission wave signal that is supplied to the power amplifier 98 does not have such a large value that a sufficient level of linearity cannot be secured in the power amplifier 98. Therefore, a transmission wave signal that is actually supplied to the antenna system is prevented from containing undesirable spurious components, effective use of radio frequencies is enabled, and the transmission quality and the service quality are kept high.

Incidentally, in the above conventional example, the peak value of the instantaneous value of the transmission wave signal (or subtransmission wave signal) is proportional to the square of the multiplicity n and its average power is proportional to the multiplicity n.

That is, the peak factor (defined as a ratio of a maximum power to an average power or a ratio of a maximum value to an average value of instantaneous values) of the transmission wave signal (or subtransmission wave signal) increases as the multiplicity n increases. Therefore, spurious components occur undesirably in the power amplifier 98 and it is highly probable that such spurious components are emitted from the antenna system.

Such spurious components can be avoided by giving sufficient output back off to the power amplifier 98. However, in general, such output back off is attained by setting the saturation output level of the power amplifier 98 large and thereby making the level of a transmission wave signal that is output from the power amplifier 98 small relative to the saturation output level. Therefore, increasing the output back off is a factor of lowering the total power efficiency to a large extent, and the output back off is not employed in practice.

In general, the multiplicity n is necessarily set at a large value in such a radio base station that a lot of terminals may concentrate in its wireless zone and many calls may occur in those terminals in parallel.

Further, since the amplitude controlling parts 93-1 to 93-n adjust the amplitudes of n delayed spread signals discretely chip by chip, respectively, the chip-by-chip amplitude of a subtransmission wave signal may become too large in a one-shot-like manner (or sporadically). In such a case, it is highly probable that in the filtering processing that is performed by each of the filters 94-1 to 94-n an undue variation occurs in the amplitudes of chips adjacent to such a chip.

Where all or part of the components shown in FIG. 8 are implemented as digital signal processing, in such digital signal processing larger round-off error occurs when the multiplicity n or the peak factor is larger even if a subject of operation is scaled in advance as numerical information that gives a sufficient level of linearity in the dynamic range of the amplitude of a subtransmission wave signal or a transmission wave signal.

Therefore, unless a sufficient amount of processing to allow increase in the word length of the subject of operation is secured, it is highly probable to cause attendant technical problems such as an undue elevation of the noise floor of a transmission wave signal.

SUMMARY OF THE INVENTION

An object of the present invention is to provide a spread-signal multiplexing circuit which adapts to various degrees of multiplicity and keeps a high SN ratio and power efficiency, without large modifications in its basic configuration.

Another object of the invention is to achieve cost reduction, an increase in the total reliability as well as adaptation to various degrees of multiplicity and standardization of the configuration in a system or an apparatus to which the invention is applied.

Another object of the invention is to simplify the configuration and to multiplex spread signals with accuracy without causing a great disorder in the distribution of major components of the spread signals in the occupied band.

Another object of the invention is to prevent spread signals from having unnecessary distortion and to thereby allow these to become subjects of linear processing such as multiplexing.

Another object of the invention is to avoid unnecessary attenuation in spread signals of low level and to keep a high stable transmission quality, in contrast to the case that all spread signals to be multiplexed are weighted.

Another object of the invention is to multiplex spread signals with accuracy without causing a great disorder in the distribution of major components of the spread signals in the occupied band.

Another object of the invention is to avoid unnecessary attenuation of spread signals of low levels and to keep a higher transmission quality.

Another object of the invention is to secure a time that is necessary to select spread signals to be weighted from all the spread signals and to determine (calculate) weights to be used for the weighting.

Still another object of the invention is to make good, stable use of inherent functions of an apparatus or a system that is equipped with a spread-signal multiplexing circuit of the invention.

Yet another object of the invention is to make proper and effective use of the dynamic range of a multiplexing part in conformity with the multiplicity and to keep a high total SN ratio even with changes in the multiplicity.

A further object of the invention is to satisfy inherent requirements for the system and maintain desired performance and functions in a system to which the invention is applied.

The invention provides a first spread-signal multiplexing circuit which frequency-multiplexing a plurality of spread signals to determine amplitude of a resulting signal (subtransmission wave signal) in time-series order, and weights the spread signals with respective weights which are smaller as an average value of the amplitude becomes larger.

At updating the weights, the weights do not change sharply in values, and the weights are updated at points in time when the amplitude of the resulting signal becomes large as well as with intervals that include the points in time on the time axis, and during which an average value of the amplitude is collectively obtained.

The invention provides a second spread-signal multiplexing circuit which amplitude-limits each of spread signals in accordance with respective amplitude of the spread signals determined in time-series order.

In this spread-signal multiplexing circuit, the amplitude of all the spread signals is maintained at a value smaller than or equal to an upper limit value that conforms to amplitude of a signal obtained by multiplexing the spread signals.

The invention provides a third spread-signal multiplexing circuit which multiplexes a plurality of spread signals and amplitude-limits each of the spread signals in accordance with amplitude of a resulting signal.

In this spread-signal multiplexing circuit, the amplitude of all the spread signals is maintained at a value smaller than or equal to an upper limit value that conforms to the amplitude of the resulting signal.

The invention provides a fourth spread-signal multiplexing circuit which weights all or part of spread signals whose amplitude exceeds a prescribed threshold value among a plurality of spread signals.

In this spread-signal multiplexing circuit, the weighting is performed only on particular spread signals that are major factors of causing a multiplexed signal to have too large amplitude.

The invention provides a fifth spread-signal multiplexing circuit which selects all or part of a plurality of spread signals in descending order of amplitude and weights the selected spread signals by using weights that are smaller as the amplitude of the selected spread signals is larger.

In this spread-signal multiplexing circuit, the weighting is performed only on particular spread signals that are major factors of causing a multiplexed signal to have too large amplitude.

The invention provides a sixth spread-signal multiplexing circuit which weights the selected spread signals by using weights that are obtained through multiplication by coefficients that decrease as the amplitude of the selected spread signals increases.

In this spread-signal multiplexing circuit, the weighting is performed only on particular spread signals that are major factors of causing a multiplexed signal to have too large amplitude by using weights that decrease as the amplitude increases.

The invention provides a seventh spread-signal multiplexing circuit which frequency-multiplexes a plurality of spread signals, smoothes amplitude of a resulting signal (subtransmission wave signal), and weights the plurality of spread signals for the frequency-multiplexing, with weights that are smaller as an average value of the smoothed amplitude is larger.

At updating the weights, the weights do not change sharply in values, and the weights are updated at points in time when the amplitude of the resulting signal becomes large as well as with intervals that include the points in time on the time axis, and during which an average value of the amplitude is collectively obtained.

The invention provides an eighth spread-signal multiplexing circuit which frequency-multiplexes a plurality of spread signals and determines maximum amplitude of a resulting signal in a prescribed window, and weights the spread signals using weights that are smaller as the maximum amplitude is larger.

At updating the weights, the weights do not change sharply in values, and the weights are updated at points in time when the amplitude of the resulting signal becomes large as well as with intervals that include the points in time on the time axis, and during which an average value of the amplitude is collectively obtained.

The invention provides a ninth spread-signal multiplexing circuit which weights all or only part of spread signals whose average value of the amplitude exceeds a prescribed upper limit value.

In this spread-signal multiplexing circuit, in contrast to the case that all spread signals to be multiplexed are weighted, unnecessary attenuation of low-level spread signals can be avoided.

The invention provides a 10th spread-signal multiplexing circuit which bandwidth-limits a plurality of spread signals within a band that is wider than a band used for bandwidth-limiting that is performed prior to final frequency multiplexing. The band-width-limiting is performed during the process of obtaining amplitude of the spread signals.

In this spread-signal multiplexing circuit, it is possible to determine, irrespective of the number of spread signals to be multiplexed, amplitude of a multiplexed signal with efficiency and accuracy prior to the multiplexing.

The invention provides an 11th spread-signal multiplexing circuit in which the weights used for the weighting are set at such values as to maintain characteristics or performance of downstream circuits.

Stable desired functions are attained in an apparatus or a system that is equipped with this spread-signal multiplexing circuit and the downstream circuits.

The invention provides a 12th spread-signal multiplexing circuit in which the weights used for the weighting are given as a monotonic non-increasing function of the number of spread signals to be frequency-multiplexed.

In this spread-signal multiplexing circuit, the spread signals to be multiplexed are weighted as appropriate prior to the multiplexing by using the weights that are smaller as the number of spread signals is smaller.

The invention provides a 13th spread-signal multiplexing circuit in which the weights used for the weighting conform to all or part of monitoring, control, maintenance, and operation of a system that performs prescribed processing on the spread signals.

In a system to which the invention is applied, inherent requirements for the system are satisfied.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 1 is a block diagram showing the principles of spread-signal multiplexing circuits according to the present invention;

FIG. 8 shows the configuration of an exemplary conventional spread-signal multiplexing circuit.

DESCRIPTION OF THE PREFERRED EMBODIMENTS

Figure 2:
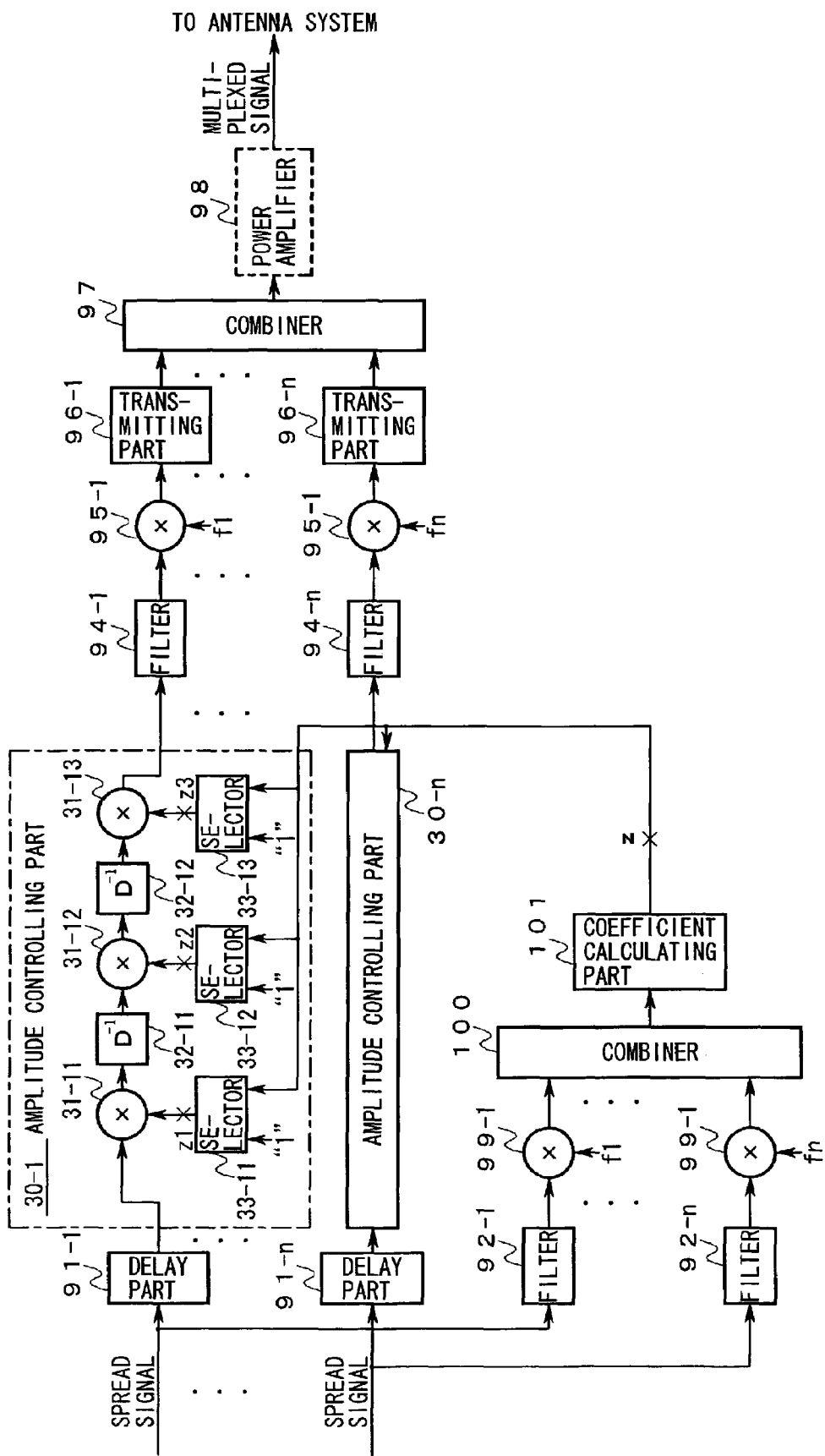
FIG. 2 shows a first embodiment of the invention.

First, the principles of spread-signal multiplexing circuits according to the present invention will be described with reference to FIG. 1.

FIG. 1 is a block diagram showing the principles of spread-signal multiplexing circuits according to the invention. The spread-signal multiplexing circuits shown in FIG. 1 are composed of all or part of an amplitude monitoring part 11, 11A, 11B, or 11C, a delaying part 12, 12A, 12B, or 12C, a multiplexing part 13, 13A, 13B, or 13C, an amplitude controlling part 15 or 15A, and a selecting part 14 or 14A.

The principles of the spread-signal multiplexing circuits according to the invention will be described below with reference to FIG. 1.

The principle of a first spread-signal multiplexing circuit according to the invention is as follows.

The amplitude monitoring part 11 multiplexes a plurality of spread signals and determines amplitude of a resulting signal (subtransmission wave signal) in time-series order. The delaying part 12 delays the spread signals in parallel by a time that corresponds to a propagation delay time of the amplitude monitoring part 11 and thereby generates delayed spread signals. The multiplexing part 13 generates a multiplexed signal by multiplexing the delayed spread signals while weighting the delayed spread signals in parallel using weights that are smaller as an average value of the amplitude determined by the amplitude monitoring part 11 is larger.

At updating the weights, the weights do not change sharply in values, and the weights are updated at points in time when the amplitude of the resulting signal becomes large as well as with intervals that include the points in time on the time axis, and during which the amplitude monitoring part 11 collectively obtains an average value of the amplitude.

Therefore, the spread signals are multiplexed with accuracy without a large disorder in the distribution of major components of each of the spread signals in the inherent occupied band.

The principle of a second spread-signal multiplexing circuit according to the invention is as follows.

The amplitude monitoring part 11 multiplexes a plurality of spread signals and determines amplitude of a resulting signal in time-series order. The amplitude controlling part 15 amplitude-limits each of the spread signals in accordance with the amplitude of the spread signals determined in time-series order.

With this configuration, the amplitude of all the spread signals are kept smaller than or equal to an upper limit value that conforms to amplitude of a signal obtained by multiplexing the spread signals.

Therefore, the spread signals does not have undesirable distortion and hence can be subjects of linear processing such as multiplexing as long as the upper limit value is proper.

The principle of a third spread-signal multiplexing circuit according to the invention is as follows.

The amplitude monitoring part 11C multiplexes a plurality of spread signals and determines amplitude of a resulting signal. The amplitude controlling part 15A amplitude-limits each of the spread signals in accordance with the amplitude determined by the amplitude monitoring part 11C.

With this configuration, the amplitude of all the spread signals are kept smaller than or equal to an upper limit value that conforms to amplitude of a signal obtained by multiplexing the spread signals.

Therefore, the spread signals does not have undesirable distortion and hence can be subjects of linear processing such as multiplexing as long as the upper limit value is proper.

The principle of a fourth spread-signal multiplexing circuit according to the invention is as follows.

The selecting part 14 selects all or part of delayed spread signals whose amplitude exceeds a prescribed threshold value from the delayed spread signals generated by the delaying part 12, 12A, or 12B. The multiplexing part 13, 13A, or 13B weights only the delayed spread signals selected by the selecting part 14.

With this configuration, the weighting is performed only on particular spread signals that are major factors of causing a multiplexed signal generated by the multiplexing part 13, 13A, or 13B to have too large amplitude.

Therefore, in contrast to the case that all spread signals to be multiplexed are weighted, unnecessary attenuation of low-level spread signals can be avoided and a high transmission quality is therefore attained.

The principle of a fifth spread-signal multiplexing circuit according to the invention is as follows.

The selecting part 14A selects, in descending order of amplitude, all or part of the delayed spread signals generated by the delaying part 12, 12A, or 12B. The multiplexing part 13, 13A, or 13B weights the delayed spread signals selected by the selecting part 14A using weights which are smaller as the amplitude becomes larger.

With this configuration, the weighting is performed only on particular spread signals that are major factors of causing a multiplexed signal generated by the multiplexing part 13, 13A, or 13B to have too large amplitude.

Therefore, in contrast to the case that all spread signals to be multiplexed are weighted, unnecessarily attenuating low-level spread signals can be avoided so that a high transmission quality is attained.

The principle of a sixth spread-signal multiplexing circuit according to the invention is as follows.

The multiplexing part 13, 13A, or 13B weights the delayed spread signals selected by the selecting part 14 or 14A using weights that are obtained through multiplication by coefficients that decrease as the amplitude of the delayed spread signals selected by the selecting part 14 or 14A increases.

With this configuration, the weighting is performed only on particular spread signals, which are major factors of causing a multiplexed signal generated by the multiplexing part 13, 13A, or 13B to have unduly large amplitude, by using weights that decrease as the amplitude increases.

Therefore, in contrast to the case that particular spread signals are weighted by using a common weight or weights that are irrelevant to their respective amplitudes, unnecessarily attenuating low-level spread signals can be avoided, therefore, a high transmission quality is attained.

The principle of a seventh spread-signal multiplexing circuit according to the invention is as follows.

The amplitude monitoring part 11A multiplexes a plurality of spread signals, smoothes amplitude of a resulting signal (subtransmission wave signal), and obtains an average value of the smoothed amplitudes in time-series order. The delaying part 12A delays the spread signals in parallel by a time that corresponds to a propagation delay time of the amplitude monitoring part 11A and thereby generates delayed spread signals. The multiplexing part 13A generates a multiplexed signal by multiplexing the delayed spread signals while weighting the delayed spread signals in parallel using weights that are smaller as the average value obtained by the amplitude monitoring part 11A is larger.

At updating the weights, the weights do not change sharply in values, and the weights are updated at points in time when the amplitude of the resulting signal becomes large as well as with intervals that include the points in time on the time axis, and during which an average value of the amplitude is collectively obtained.

Therefore, the spread signals are multiplexed with accuracy without causing a large disorder in the distribution of major components in the inherent occupied band of each of the spread signals.

The principle of an eighth spread-signal multiplexing circuit according to the invention is as follows.

The amplitude monitoring part 11B multiplexes a plurality of spread signals and obtains maximum amplitude of a resulting signal (subtransmission wave signal) in a prescribed window in time-series order. The delaying part 12B delays the spread signals in parallel by a time that corresponds to a propagation delay time of the amplitude monitoring part 11B and thereby generates delayed spread signals. The multiplexing part 13B generates a multiplexed signal by multiplexing the delayed spread signals while weighting the delayed spread signals in parallel using weights that are smaller as the maximum amplitude obtained by the amplitude monitoring part 11B is larger.

At updating the weights, the weights do not change sharply in values, and the weights are updated at points in time when the amplitude of the resulting signal becomes large as well as with intervals that include the points in time on the time axis, and during which a maximum value of the amplitude is collectively obtained, though the processing performed by the amplitude monitoring part 11B is different from that performed by the amplitude monitoring part 11A of the seventh spread-signal multiplexing circuit.

Therefore, the spread signals are multiplexed with accuracy without a large disorder in the distribution of major components in the inherent occupied band of each of the spread signals.

The principle of a ninth spread-signal multiplexing circuit according to the invention is as follows.

The multiplexing part 13, 13A, or 13B weights all or part of delayed spread signals whose average value of the amplitude determined by the amplitude monitoring part 11, 11A, or 11B exceeds a prescribed upper limit value among the delayed spread signals generated by the delaying part.

In contrast to the case that all spread signals to be multiplexed are weighted, unnecessary attenuation of low-level spread signals can be avoided, therefore, a high transmission quality is achieved.

The principle of a 10th spread-signal multiplexing circuit according to the invention is as follows.

The amplitude monitoring part 11, 11A, or 11B bandwidth-limits the spread signals generated by the delaying part 12, 12A or 12B within a band that is wider than a band within which the multiplexing part 13, 13A, or 13B bandwidth-limits the delayed spread signals prior to multiplexing those.

As long as a band to be used for the bandwidth limiting can be set properly, amplitude of a multiplexed signal is determined efficiently prior to the multiplexing irrespective of the number of spread signals to be multiplexed.

This makes it possible to secure the time necessary to select spread signals to be weighted from all the spread signals and to determine (calculate) weights to be used for the weighting.

The principle of an 11th spread-signal multiplexing circuit according to the invention is as follows.

The weights are set at such values as to maintain characteristics or performance of circuits provided downstream of the multiplexing part 13, 13A, or 13B.

With this configuration, stable desired functions are attained in an apparatus or a system that is equipped with the spread-signal multiplexing circuit according to the invention and the downstream circuits.

The principle of a 12th spread-signal multiplexing circuit according to the invention is as follows.

The weights that the multiplexing part 13, 13A, or 13B uses are a monotonic non-increasing function of the number of spread signals to be multiplexed.

With this configuration, the spread signals to be multiplexed are weighted as appropriate prior to the multiplexing by using the weights that are smaller as the number of spread signals is smaller.

Therefore, even with changes in the multiplicity of the multiplexing, it is possible to make proper, effective use of the dynamic range of the multiplexing part 13, 13A, or 13B in conformity with the multiplicity and to keep a high total SN ratio.

The principle of a 13th spread-signal multiplexing circuit according to the invention is as follows.

With this configuration, the weights that the multiplexing part 13, 13A, or 13B uses conform to all or part of monitoring, control, maintenance, and operation of a system that performs prescribed processing on the spread signals.

In a system to which the invention is applied, therefore, inherent requirements for the system are satisfied, and desired performance and functions are attained. Embodiments of the invention will be hereinafter described in detail with reference to the drawings.

FIG. 2 shows a first embodiment of the invention.

This embodiment is different from the conventional example of FIG. 8 in that amplitude controlling parts 30-1 to 30-n are provided.

The amplitude controlling part 30-1 is composed of the following components:

A multiplier 31-11 one input of which is connected to the output of the delay part 91-1.

A delay element 32-11 that is provided immediately downstream of the multiplier 31-11.

A multiplier 31-12 one input of which is connected to the output of the delay element 32-11.

A delay element 32-12 that is provided immediately downstream of the multiplier 31-12.

A multiplier 31-13 one input of which is connected to the output of the delay element 32-12.

Selectors 33-11 to 33-13 one inputs of which are supplied with a common value (hereinafter referred to as "reference value") "1," the other inputs of which are together connected to the output of the coefficient calculating part 101, and the outputs of which are connected to the other inputs of the multipliers 31-11 to 31-13, respectively.

The configurations of the amplitude controlling parts 30-2 to 30-n are the same as the configuration of the amplitude controlling part 30-1, and hence will not be described or illustrated with their components given symbols that are different from the symbols of the corresponding components of the amplitude controlling part 30-1 only in that the first suffix is one of "2" to "n."

The operation of the first embodiment of the invention will be described below with reference to FIG. 2.

In the following description, an item that is common to n spread signals and components (including the amplitude controlling parts 30-1 to 30-n) corresponding to the respective spread signals will be described with those components given a first suffix "c" which represents suffixes "1" to "n."

The delay time of each of the delay elements $32\text{-}c1$ and $32\text{-}c2$ is set equal to the chip period of the n spread signals in advance. And the delay time of the delay part $91\text{-}c$ is set, in advance, shorter than in the conventional example by the chip period (i.e., the delay time of the delay element $32\text{-}c1$). It is assumed that the propagation delay times of the multipliers $31\text{-}c1$ to $31\text{-}c3$ are sufficiently shorter than the delay time of any of the delay elements $32\text{-}c1$ to $32\text{-}c3$.

Therefore, at a time point when a coefficient z has been calculated by the coefficient calculating part 101, corresponding chips of spread signals that have been multiplexed into the subtransmission wave signal are supplied to the inputs of the multipliers $31\text{-}c2$ and chips preceding and following those chips are input to the inputs of the multipliers $31\text{-}c3$ and $31\text{-}c1$, respectively, in parallel.

The selectors $33\text{-}c1$ to $33\text{-}c3$ judge whether the thus-calculated coefficient z exceeds a prescribed threshold value (for the sake of simplicity, it is assumed to be a constant "1"). If the judgment results are "false," the selectors $33\text{-}c1$ to $33\text{-}c3$ output the above-mentioned reference value "1" as respective suppression coefficients z1, z2, and z3.

On the other hand, if the judgment results are "true," the selectors $33\text{-}c1$ to $33\text{-}c3$ output the respective suppression coefficients z1, z2, and z3 that are given by the following equations where correction coefficients $\alpha$ and $\beta$ have positive values that are smaller than or equal to "1":

$$z1 = \alpha \cdot z$$
$$z2 = z \quad (1)$$
$$z3 = \beta \cdot z$$

That is, in this embodiment, for a chip whose amplitude exceeds the above-mentioned upper limit value among time-series chips of the subtransmission wave signal, corresponding chips of the spread signals are multiplied by the suppression coefficient z2 that is smaller than "1". For chips that precede and follow the above chip, corresponding chips of the spread signals are multiplied by the suppression coefficients z3 and z1 that are smaller than or equal to the suppression coefficient z2, respectively. In this manner, shaped spread signals corresponding to the n respective spread signals are generated.

In contrast to the conventional example in which only the suppression coefficient z2 in Equation (1) is set equal to the coefficient z while both of the suppression coefficients z3 and z1 are substantially kept equal to a constant "1," in this embodiment, the frequency components of each shaped spread signal are not distributed in an improperly deviated manner and are distributed in the inherent occupied band with high reliability.

Therefore, the shaped spread signals are frequency-multiplexed and transmitted as a transmission wave signal without being distorted unduly in the filtering processing of the filters 94-c even in the case where the multiplicity n is set at a large value or may vary to a large extent.

In this embodiment, the judgments in the amplitude controlling part 3D-C as to whether the suppression coefficients z1, z2, and z3 that are not equal to "1" should be supplied to the multipliers 31-c1 to 31-c3 are performed independently by the selectors 33-c1 to 33-c3, respectively.

Figure 6:
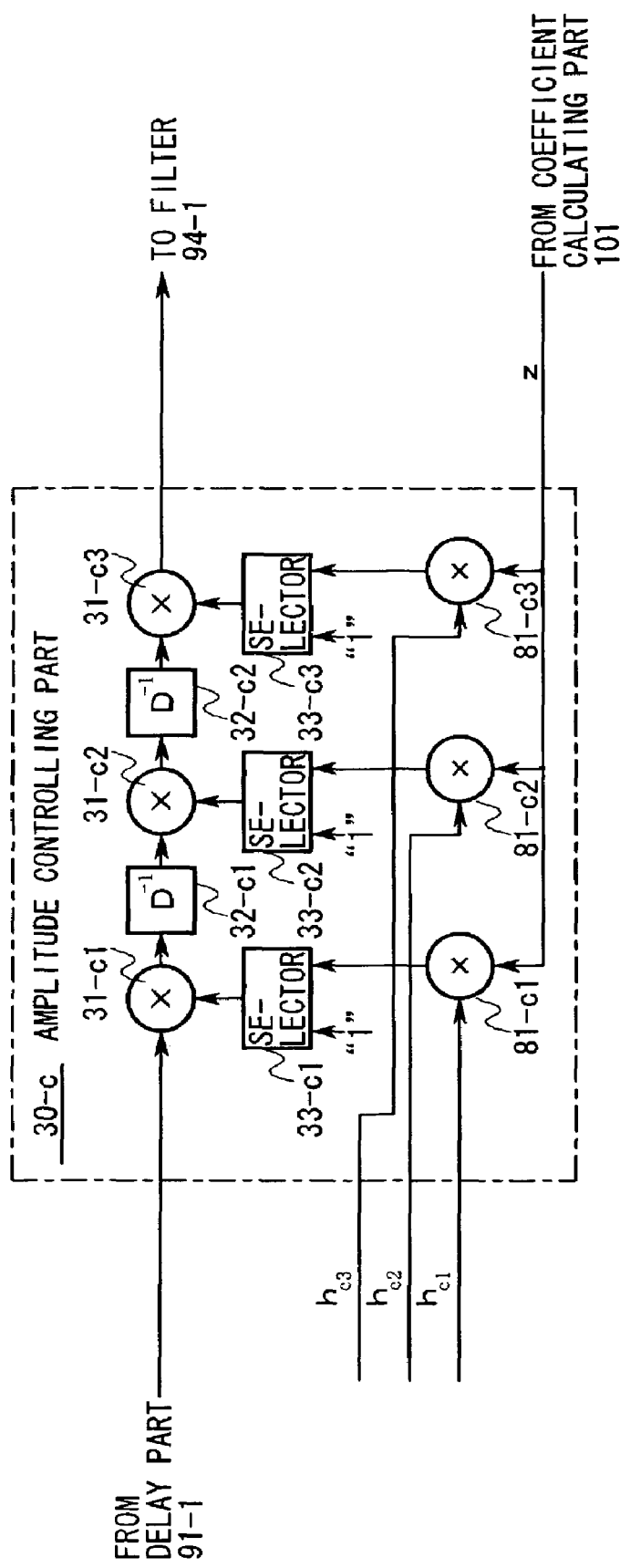
FIG. 6 shows another configuration of an amplitude controlling part.

However, the criteria of those judgments may be made more flexible in the following manner. For example, as shown in FIG. 6, multipliers 81-c1 to 81-c3 are provided between the coefficient calculating part 101 and the respective selectors 33-c1 and 33-c3. The judgment criteria are varied as appropriate in accordance with coefficients (hereinafter referred to as "adjustment coefficients") hc1 to hc3 that are supplied externally to the respective multipliers 81-c1 to 81-c3.

Windows in the time domain through which to use the adjustment coefficients hc1 to hc3 may be determined according to the following Hanning window function or any of other various window functions such as the Kayser window function, the Hamming window function, and the Blackman window function:

$$hck = \{1 - \cos(2\pi k/M)\}/2 \quad (0 \leq k \leq M)$$

Figure 3:
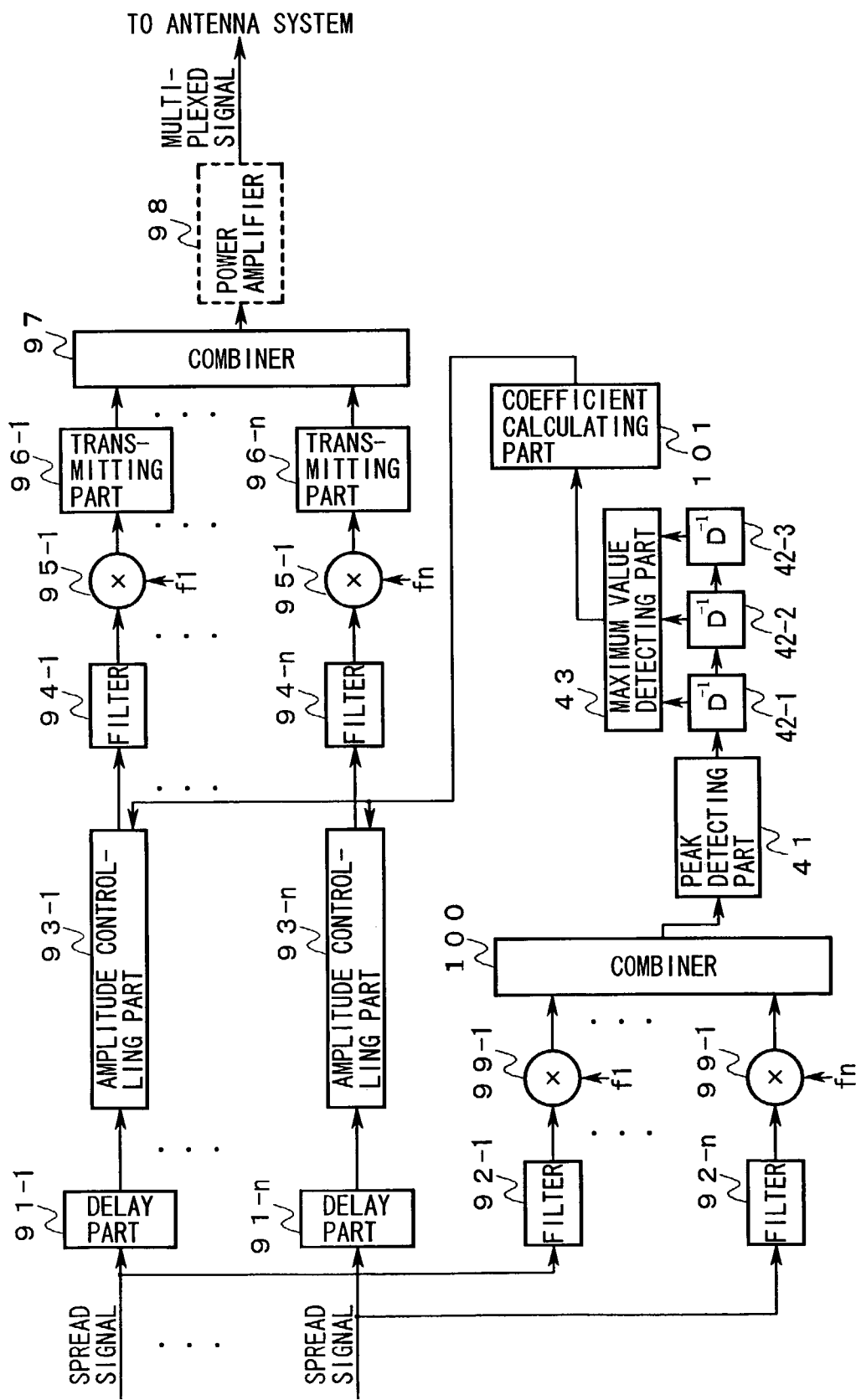
FIG. 3 shows a second embodiment of the invention.

FIG. 3 shows a second embodiment of the invention.

This embodiment is characterized in that amplitude controlling parts 93-1 to 93-n are provided and that the following components are provided between the combiner 100 and the coefficient calculating part 101:

A peak detecting part 41 and delay elements 42-1 to 42-3 that are cascade-connected to each other and connected to the output of the combiner 100.

A maximum value detecting part 43 having first to third inputs to which the outputs of all the delay elements 42-1 to 42-3 are connected, respectively. The output of the maximum value detecting part 43 is connected to the input of the coefficient calculating part 101.

The operation of the second embodiment of the invention will be described below with reference to FIG. 3.

The delay time of each of the delay elements 42-1 to 42-3 is set equal to the chip period of the n spread signals in advance.

The peak detecting part 41 detects, chip by chip, the peal value of the amplitude of a subtransmission wave signal that is generated by the combiner 100. It is assumed that the propagation delay time of the peak detecting part 41 is sufficiently shorter than the delay time of any of the delay elements 42-1 to 42-3.

The delay elements 42-1 to 42-3 sequentially capture and hold thus-detected peak values chip by chip by the first-in first-out method.

The maximum value detecting part 43 selects a maximum peak value among the three peak values that are being held by the delay elements 42-1 to 42-3.

The coefficient calculating part 101 calculates, chip by chip of the subtransmission wave signal, a coefficient z that is equal to the inverse number of a ratio of the maximum peak value to a known upper limit value that the maximum peak value is allowed to have.

The calculated coefficient z is kept constant for a period corresponding to the number of stages of the delay elements 42-1 to 42-3 (i.e., three times the chip period) unless the peak detecting part 41 detects a larger peak value, and is used in the amplitude controlling parts 93-c's weighting delayed spread signals chip by chip.

As described above, according to this embodiment, as in the case of the first embodiment, the suppression coefficient is kept constant for three times the chip period on average. Therefore, in contrast to the conventional example, the frequency components of each shaped spread signal are not distributed in an improperly deviated manner and are distributed in the inherent occupied band with high reliability.

Therefore, the configuration is made simpler than in the first embodiment, and shaped spread signals are frequency-multiplexed without being distorted unduly in the filtering processing of the filters 94-c even in the case where the multiplicity n is set at a large value or may vary to a large extent.

In this embodiment, a maximum peak value is selected through a window in the time domain that is set by the delay elements 42-1 to 42-3, and is sequentially supplied to the coefficient calculating part 101.

Figure 4:
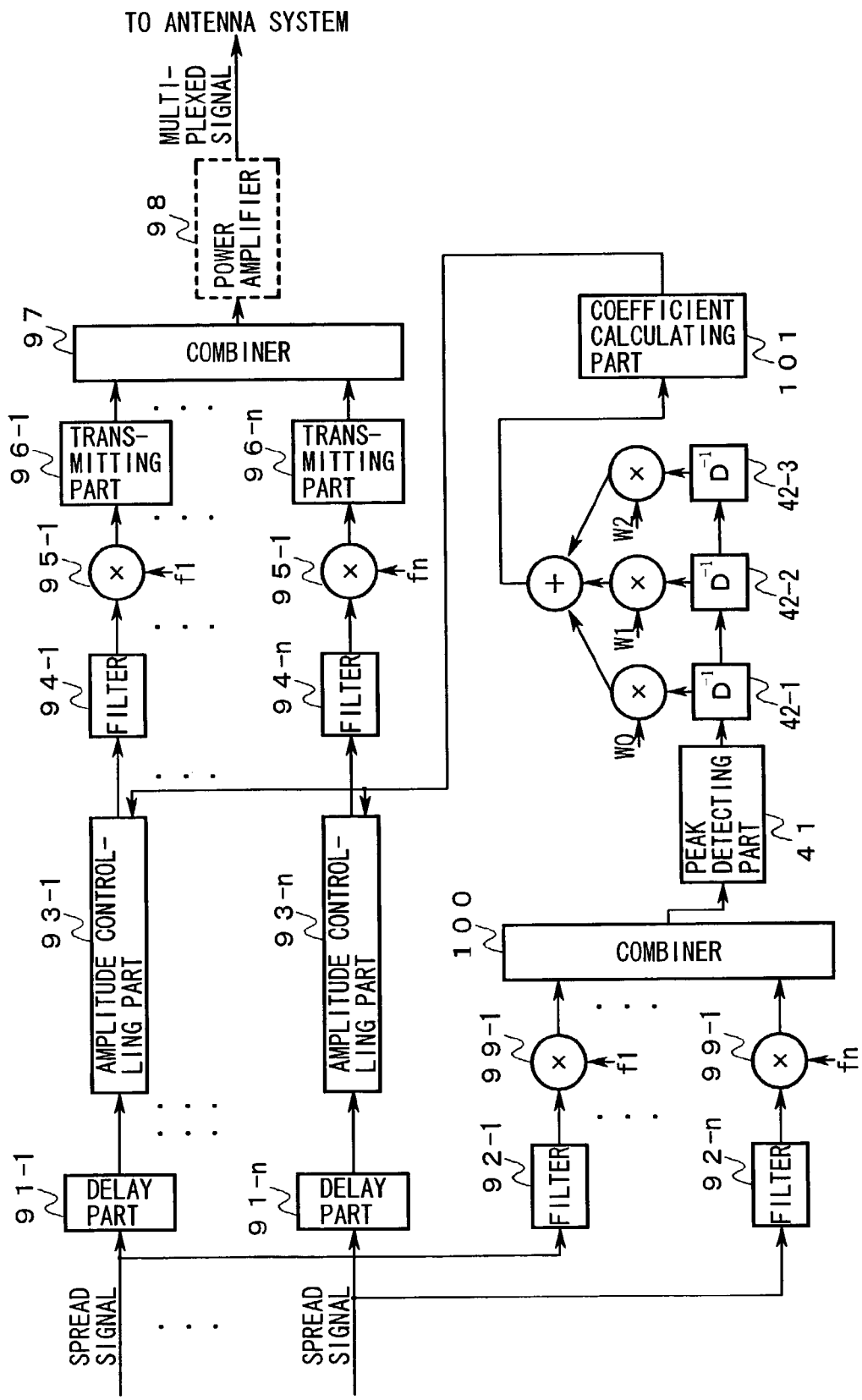
FIG. 4 shows a modification of the second embodiment.

However, for example, as shown in FIG. 4, instead of a maximum peak value among the peak values being held by the delay elements 42-1 to 42-3, the sum of generatts of prescribed weights W0 to W3 and the peak values may be supplied to the coefficient calculating part 101. This is effective in reducing distortion that may be included in a transmission wave signal.

Figure 5:
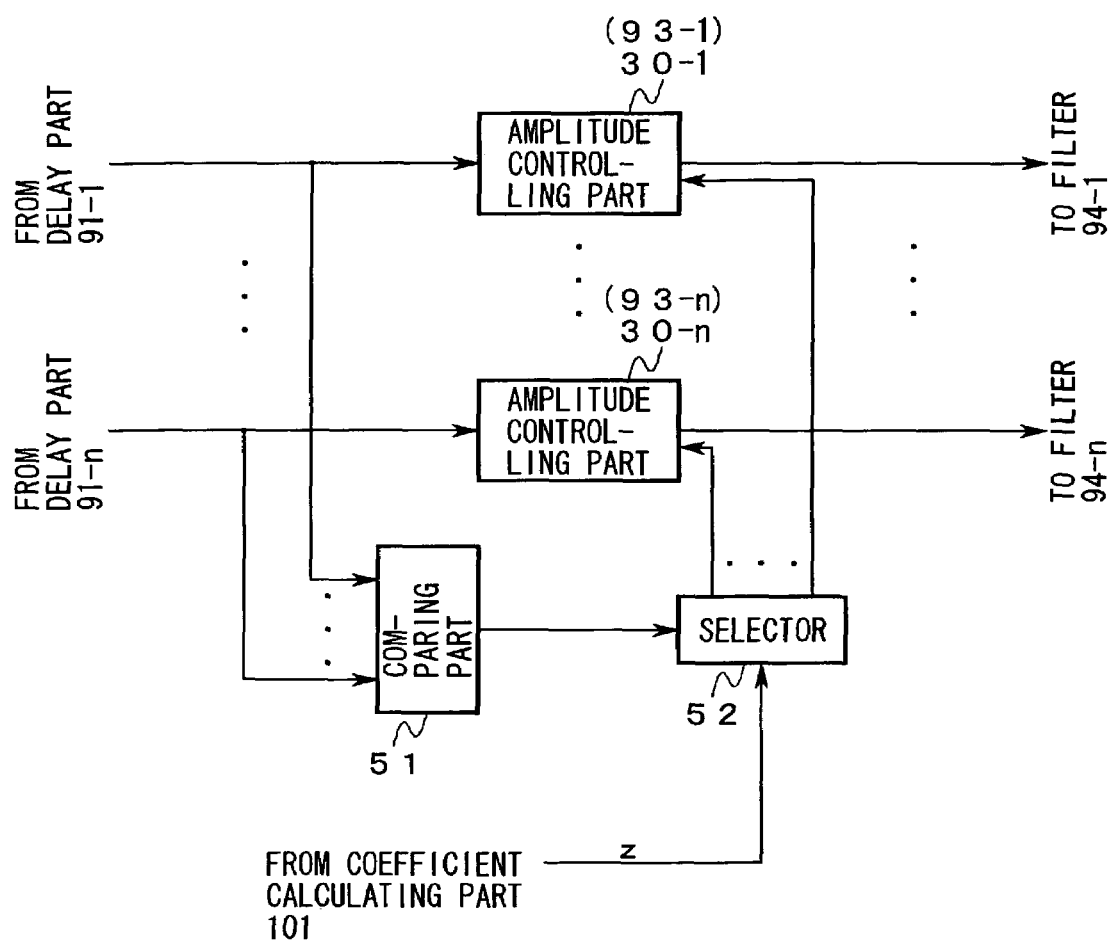
FIG. 5 shows a third embodiment of the invention.

FIG. 5 shows a third embodiment of the invention.

This embodiment is characterized by the following points, and hence for the sake of simplicity only important components in the configuration of this embodiment are shown in FIG. 5.

In this embodiment, the following components are added to the first or second embodiment:

A comparing part 51 having n inputs that are connected to the outputs of the delay parts 91-1 to 91-n, respectively.

A selector 52 having first and second inputs that are connected to the output of the comparing part 51 and the output of the coefficient calculating part 101, respectively, and n outputs that are connected to the control inputs of the amplitude controlling parts 30-1 to 30-n (or 93-1 to 93-n), respectively.

The operation of the third embodiment of the invention will be described below with reference to FIG. 5.

The comparing part 51 selects one or a plurality of spread signals (for the sake of simplicity, hereinafter referred to as "selected delayed spread signals") whose amplitudes exceed a prescribed threshold value on a chip-by-chip basis from the delayed spread signals that are supplied from the respective delay parts 91-1 to 91-n in parallel, and supplies the selector 52 with selection signals indicating the respective selected delayed spread signals in parallel.

The selector 52 supplies a coefficient z that is supplied from the coefficient calculating part 101 chip by chip to only the amplitude controlling parts corresponding to the selected delayed spread signals indicated by the selection signals among the amplitude controlling parts 30-1 to 30-n (or 93-1 to 93-n), and supplies, instead of the coefficient z, a coefficient "1" to the other amplitude controlling parts.

The processing that is performed by the components other than the comparing part 51 and the selector 52 is basically the same as in the first or second embodiment, and hence will not be described.

As described above, according to this embodiment, amplitude limiting is performed on only spread signals (delayed spread signals) that are major factors of causing the amplitude of a subtransmission wave signal to exceed a prescribed upper limit value on a chip-by-chip basis.

Therefore, in contrast to the first and second embodiments in which the amplitude limiting is performed on all spread signals (delayed spread signals) based on a common suppression coefficient, a phenomenon that low-level spread signals are unduly attenuated is avoided and the total transmission quality is kept high with high reliability.

In this embodiment, one or a plurality of selected delayed spread signals whose amplitudes exceed the prescribed threshold value are selected on a chip-by-chip basis from the delayed spread signals that are supplied from the respective delay parts 91-1 to 91-n in parallel, and the coefficient z that is supplied from the coefficient calculating part 101 chip by chip is supplied to only the amplitude controlling parts corresponding to the selected delayed spread signals.

However, the invention is not limited to such a configuration. For example, a preset number or less of delayed spread signals may be selected chip by chip in descending order of amplitude. This is effective in simplifying the operation procedure and hardware and increasing the response speed.

Figure 7:
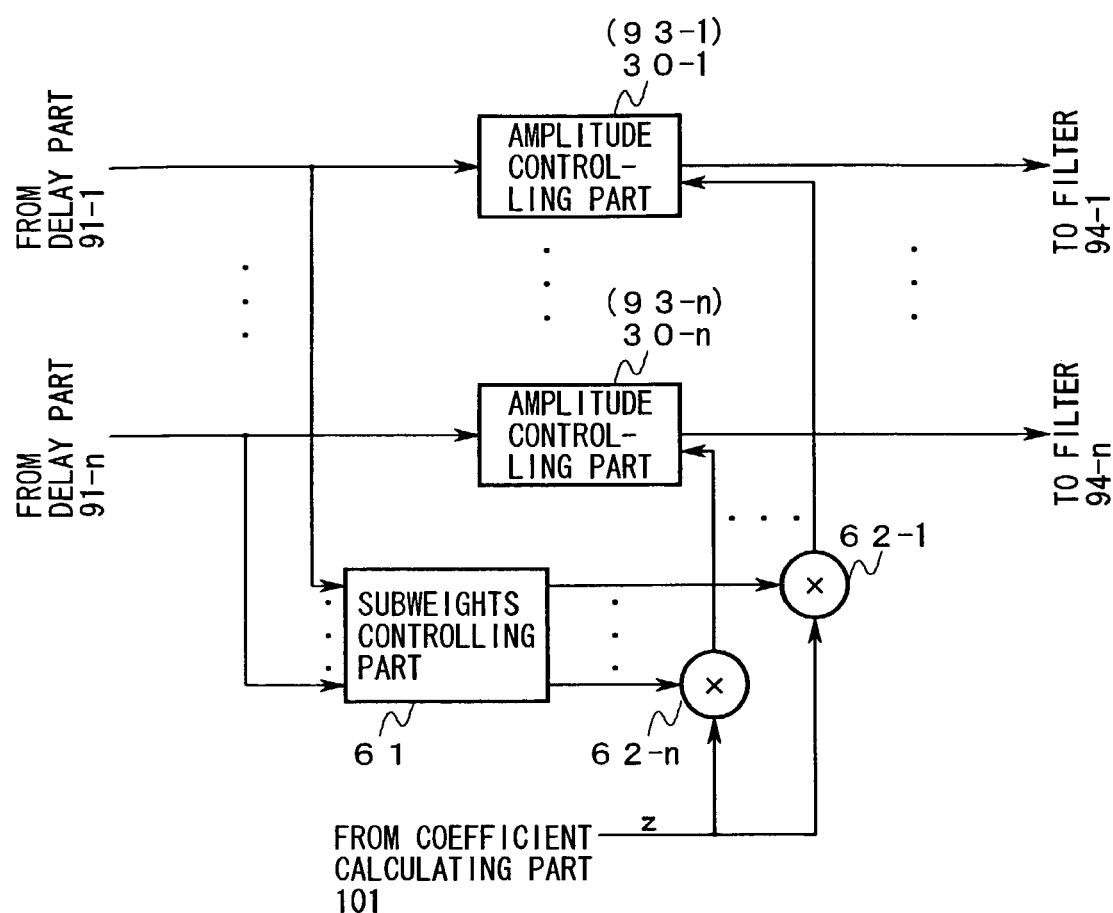
FIG. 7 shows a fourth embodiment of the invention.

FIG. 7 shows a fourth embodiment of the invention.

This embodiment is characterized by the following points, and hence for the sake of simplicity only important components in the configuration of this embodiment are shown in FIG. 7.

This embodiment is provided with the following components:

A subweights controlling part 61 that is provided in place of the above-described comparing part 51.

Multipliers 62-1 to 62-n that are provided in place of the above-described selector 52 and have respective first inputs that are together connected to the output of the coefficient calculating part 101, second inputs that are connected to the n respective outputs of the subweights controlling part 61, and outputs that are connected to the control terminals of the amplitude controlling parts 30-1 to 30-n (or 93-1 to 93-n), respectively.

The operation of the fourth embodiment of the invention will be described with reference to FIG. 7.

The subweights controlling part 61 is given in advance the number k ($\leq$n) of delayed spread signals that should be selected in descending order of chip-by-chip amplitude from the delayed spread signals to be supplied from the delay parts 91-1 to 91-n in parallel and k weights w1 to wk (for the sake of simplicity, it is assumed that they are positive constants of "1" or less and that an inequality w1$\leq$ ... $\leq$wk holds) to be used for weighting the amplitudes of the thus-selected delayed spread signals.

The subweights controlling part 61 monitors, chip by chip, the amplitudes of n delayed spread signals that are supplied from the delay parts 91-1 to 91-n in parallel and selects I( delayed spread signals (hereinafter referred to as "selected delayed spread signals") in descending order of amplitude from the n delayed spread signals.

Further, the subweights controlling part 61 outputs the k weights w1 to wk at outputs that correspond to the k respective selected delayed spread signals and outputs, as weights, constants "1" at the other outputs (these weights will be hereinafter referred to as "subweights").

The multipliers 62-c calculates the products of a coefficient z that is calculated by the coefficient calculating part 101 and the subweights that are output from the subweights controlling part 61, respectively, and supplies the calculated products to the amplitude controlling parts 30-c (or 93-c) as weights, respectively.

The processing that is performed by the amplitude controlling parts 30-c (or 93-c) is the same as in the first to third embodiment irrespective of the values of the weights, and hence will not be described.

As described above, according to this embodiment, the products of the coefficient z that is calculated by the coefficient calculating part 101 and the weights w1 to wk for delayed spread signals that are selected in descending order of chip-by-chip amplitude and the other weights that are separately supplied from the subweights controlling part 61 are used as the suppression coefficients to be used in weighting the n delayed speed signals in the amplitude controlling parts 30-c (or 93-c) in parallel.

Therefore, low-level spread signals that are not a factor of causing a subtransmission wave signal to have an unduly large amplitude on a chip-by-chip basis are frequency-multiplexed with higher reliability than in the first to third embodiments without being set at unduly low levels as long as the weights w1 to wk are given in advance as an array of proper numerical values.

In each of the above embodiments, the suppression coefficients are set smaller as the chip-by-chip amplitudes of n spread signals to be frequency-multiplexed increase. However, the suppression coefficients may be set at any values as long as spread signals are frequency-multiplexed with desired accuracy and the suppression coefficients conform to the inherent performance, specification, and other requirements of or for a system or an apparatus to which the invention is applied.

In each of the above embodiments, the passage bands of the filters 92-1 to 92-n are set wider than those of the filters 94-1 to 94-n. However, the passage bands of the filters 92-1 to 92-n may be set equal to or narrower than those of the filters 94-1 to 94-n as long as reduction in the total response speed that reflects the transmission delay time and other factors due to elongation of the set delay times of the delay parts 91-1 to 91-n is allowable.

In each of the above embodiments, the values of the suppression coefficients are varied as appropriate in a such range that a sufficient level of linearity is secured in the power amplifier 98 which is disposed downstream of the combiner 97. However, the suppression coefficients may be set at any values as long as cooperation with circuits and devices that are provided in one or both of the pre-stage and the post-stage of the spread-signal multiplexing circuit according to the invention is maintained properly.

In each of the above embodiments, the number n of spread signals to be frequency-multiplexed (i.e., the multiplicity) is kept constant. However, the invention is not limited to such a configuration. For example, the suppression coefficients that are applied to the respective spread signals may be set or updated as appropriate according to weights and an algorithm that continue to allow desired performance and other requirements to be satisfied in accordance with the number n of spread signals.

In each of the above embodiments, the suppression coefficients are set independently and updated as appropriate by the spread-signal multiplexing circuit according to the invention. However, the invention is not limited to such a configuration. For example, the suppression coefficients may be set and updated as appropriate according to the procedure of a process that relates to all or part of the monitoring, maintenance, and operation (including channel control and call setting) of a system or an apparatus to which the invention is applied.

In each of the above embodiments, the invention is applied to the frequency multiplexing on spread signals that were generated in parallel according to the direct sequence method. However, spread signals to be subjected to the frequency multiplexing are not limited to those generated according to the CDMA scheme. For example, the invention can similarly applied to the frequency multiplexing on spread signals that were generated by frequency hopping, chirping, or any other method.

In each of the above embodiments, the invention is applied to the transmission system of a radio base station that is part of a mobile communication system. However, the application field of the invention is not limited to transmitting parts of radio base stations and mobile communication systems and encompasses a variety of systems and apparatuses that are required to multiplex a plurality of spread signals. For example, the invention can be applied to not only terminals for accessing a mobile communication system but also a variety of electronic apparatuses.

The invention is not limited to the above embodiments and various modifications may be made without departing from the spirit and scope of the invention. Any improvement may be made in part or all of the components.

What is claimed is:

1. A spread-signal multiplexing circuit comprising:
   an amplitude monitoring section for multiplexing a plurality of spread signals and for determining amplitude of a resulting signal in time-series order;
   a delaying section for delaying the plurality of spread signals in parallel by a time that corresponds to a propagation delay time of said amplitude monitoring section and thereby generating delayed spread signals;
   a multiplexing section for generating a multiplexed signal by weighting the delayed spread signals with respective weights that are given as a monotonic non-increasing function of the number of spread signals to be multiplexed and by multiplexing the delayed spread signals to properly keep a dynamic range and a signal to noise ratio in conformity with respect to a multiplicity of said spread signals, the respective weights being smaller as an average value of the amplitude determined by said amplitude monitoring section becomes larger; and
   a selecting section for selecting all or part of the delayed spread signals whose amplitude exceeds a prescribed threshold value, from the delayed spread signals generated by said delaying section, wherein said multiplexing section weights only the delayed spread signal(s) selected by said selecting section.

2. The spread-signal multiplexing circuit according to claim 1, further comprising a selecting section for selecting all or part of the delayed spread signals whose amplitude exceeds a prescribed threshold value, from the delayed spread signals generated by said delaying section, wherein said multiplexing section weights the delayed spread signal(s) selected by said selecting section with respective weights that are obtained through multiplication by a coefficient, the coefficient decreasing as the amplitude of the delayed spread signals selected by said selecting section increases.

3. The spread-signal multiplexing circuit according to claim 1, wherein said multiplexing section weights only all or part of the spread signals whose average value of the determined amplitude exceeds a prescribed upper limit value, among the plurality of spread signals.

4. The spread-signal multiplexing circuit according to claim 1, wherein said amplitude monitoring section bandwidth-limits the plurality of spread signals within a band that is wider than a band within which said multiplexing section bandwidth-limits the delayed spread signals generated by said delaying section before multiplexing.

5. A spread-signal multiplexing circuit comprising:
   an amplitude monitoring section for multiplexing a plurality of spread signals, smoothing amplitude of a resulting signal, and obtaining an average value of the smoothed amplitude in time-series order;
   a delaying section for delaying the plurality of spread signals in parallel by a time that corresponds to a propagation delay time of said amplitude monitoring section and thereby generating delayed spread signals; and
   a multiplexing section for generating a multiplexed signal by weighting the delayed spread signals with respective weights that are given as a monotonic non-increasing function of the number of spread signals to be multiplexed and by multiplexing the delayed spread signals to properly keep a dynamic range and a signal to noise ratio (SNR) in conformity with respect to a multiplicity of said plurality of spread signals, the respective weights being smaller as the average value obtained by said amplitude monitoring section becomes larger; and
   a selecting section for selecting all or part of delayed spread signals whose amplitude exceeds a prescribed threshold value, from the delayed spread signals generated by said delaying section, wherein said multiplexing section weights only the delayed spread signals selected by said selecting section.

6. The spread-signal multiplexing circuit according to claim 5, further comprising a selecting section for selecting all or part of the delayed spread signals whose amplitude exceeds a prescribed threshold value, from the delayed spread signals generated by said delaying section, wherein said multiplexing section weights the delayed spread signal(s) selected by said selecting section with respective weights that are obtained through multiplication by a coefficient, the coefficient decreasing as the amplitude of the delayed spread signals selected by said selecting section increases.

7. The spread-signal multiplexing circuit according to claim 5, wherein said multiplexing section weights only all or part of the spread signals whose average value of the determined amplitude exceeds a prescribed upper limit value, among the plurality of spread signals.

8. The spread-signal multiplexing circuit according to claim 5, wherein said amplitude monitoring section bandwidth-limits the plurality of spread signals within a band that is wider than a band within which said multiplexing section bandwidth-limits the delayed spread signals generated by said delaying section before multiplexing.

9. A spread-signal multiplexing circuit comprising:
   an amplitude monitoring section for multiplexing a plurality of spread signals and for determining maximum amplitude of a resulting signal in a prescribed window;
   a delaying section for delaying the plurality of spread signals in parallel by a time that corresponds to a propagation delay time of said amplitude monitoring section and thereby generating delayed spread signals;
   a multiplexing section for generating a multiplexed signal by weighting the delayed spread signals with respective weights that are given as a monotonic non-increasing function of the number of spread signals to be multiplexed and by multiplexing the delayed spread signals to properly keep a dynamic range and a signal to noise ratio in conformity with respect to a multiplicity of said spread signals, the respective weights being smaller as the maximum amplitude obtained by said amplitude monitoring section becomes larger; and a selecting section for selecting all or part of the delayed spread signals whose amplitude exceeds a prescribed threshold value, from the delayed spread signals generated by said delaying section, wherein said multiplexing section weights only the delayed spread signal(s) selected by said selecting section.

10. The spread-signal multiplexing circuit according to claim 9, further comprising a selecting section for selecting all or part of the delayed spread signals whose amplitude exceeds a prescribed threshold value, from the delayed spread signals generated by said delaying section, wherein said multiplexing section weights the delayed spread signal(s) selected by said selecting section with respective weights that are obtained through multiplication by a coefficient, the coefficient decreasing as the amplitude of the delayed spread signals selected by said selecting section increases.

11. The spread-signal multiplexing circuit according to claim 9, wherein said multiplexing section weights only all or part of the spread signals whose average value of the determined amplitude exceeds a prescribed upper limit value, among the plurality of spread signals.

12. The spread-signal multiplexing circuit according to claim 9, wherein said amplitude monitoring section bandwidth-limits the plurality of spread signals within a band that is wider than a band within which said multiplexing section bandwidth-limits the delayed spread signals generated by said delaying section before multiplexing.

* * * * *